July 8, 1958
K. C. KNAPP
2,841,893
PIPELINE RECLAIMER
Filed Dec. 24, 1953
3 Sheets-Sheet 1
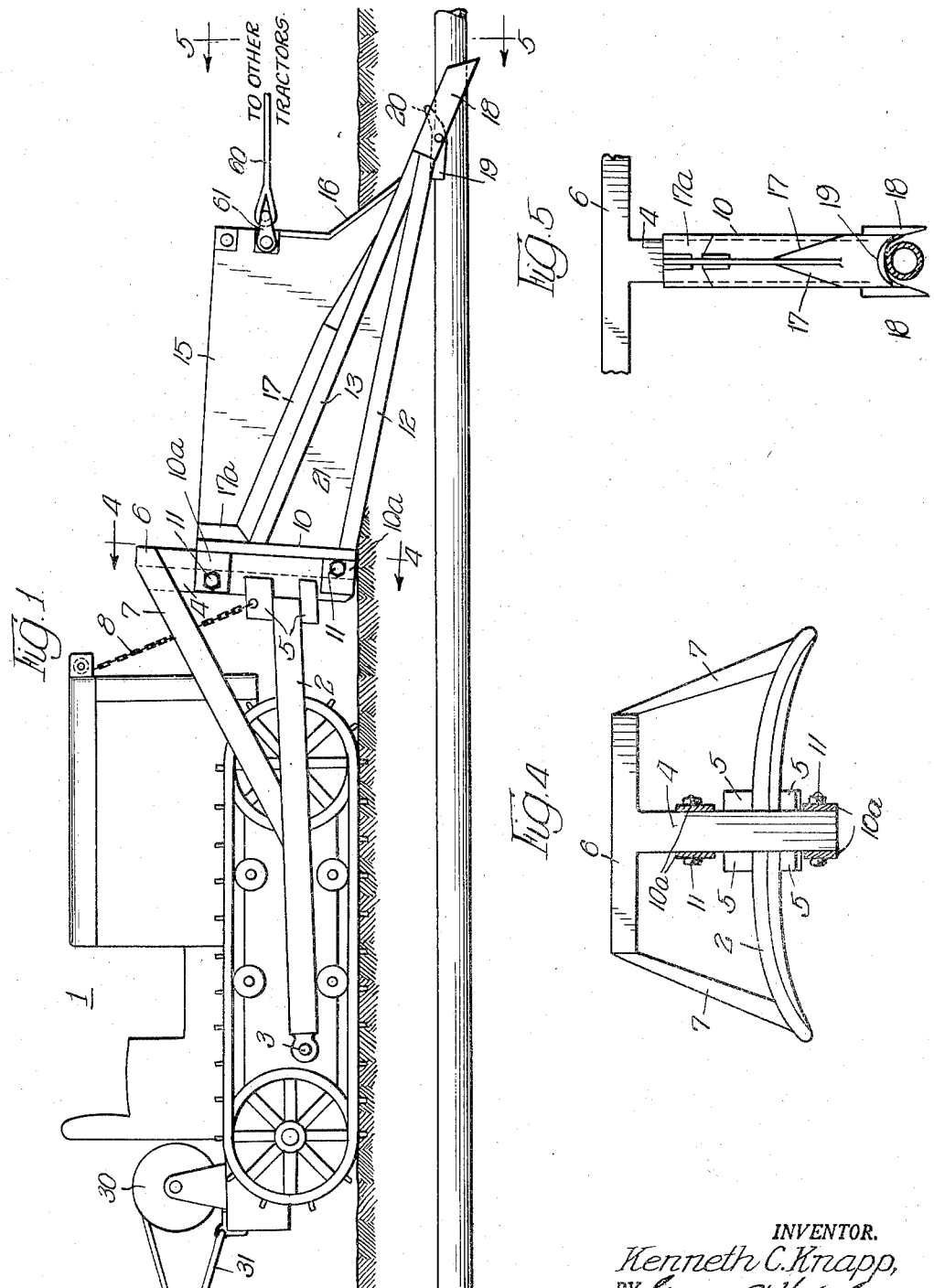
INVENTOR.
Kenneth C. Knapp,
BY George J. Haight &
George H. Simmons ATTYS

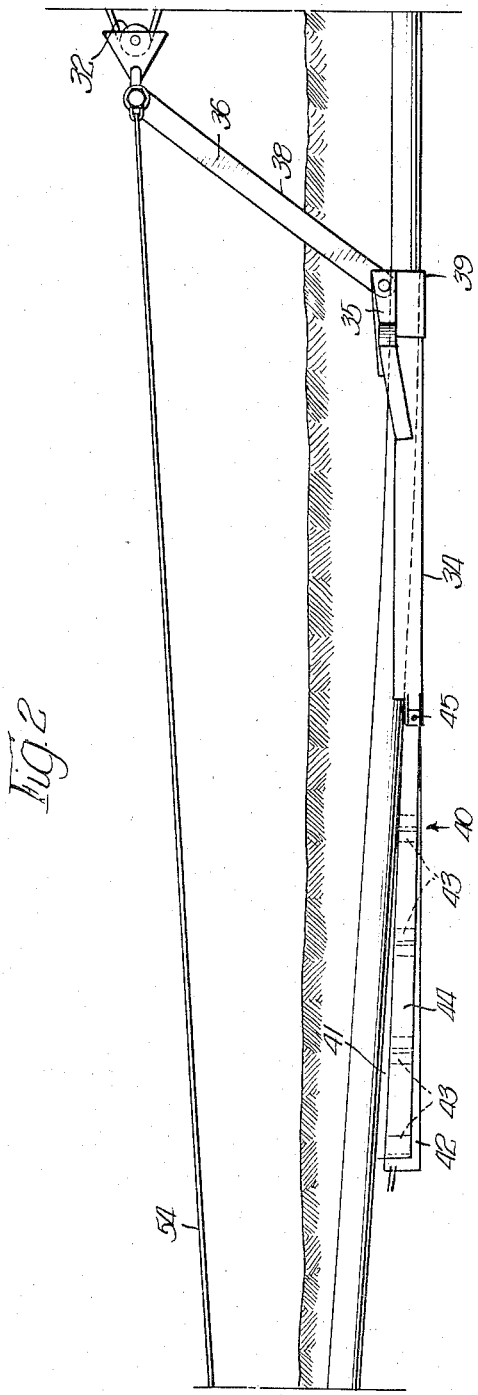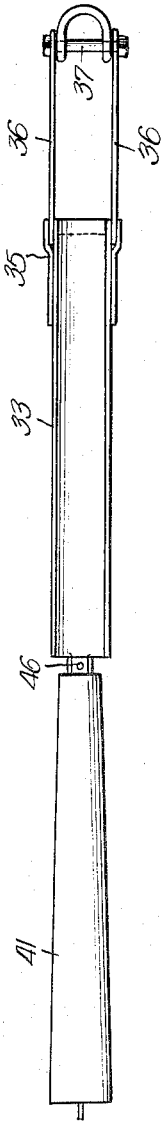

July 8, 1958 K. C. KNAPP 2,841,893
PIPELINE RECLAIMER
Filed Dec. 24, 1953 3 Sheets-Sheet 3
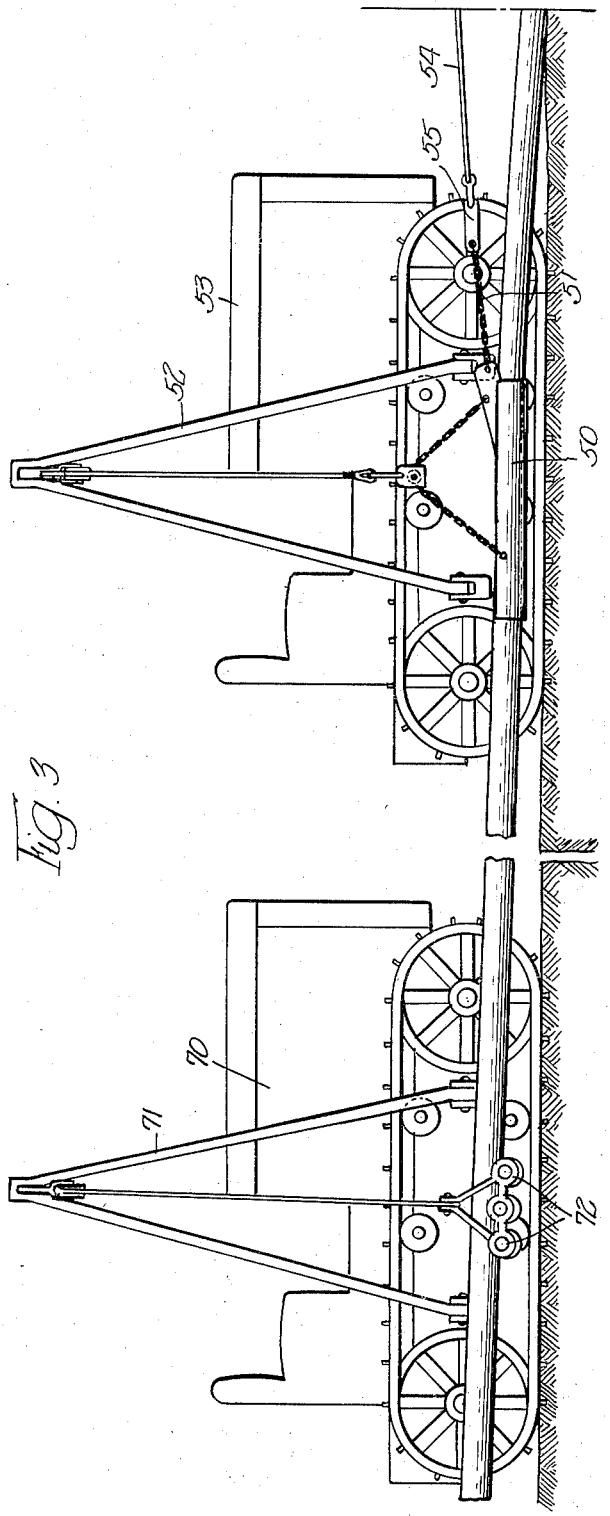
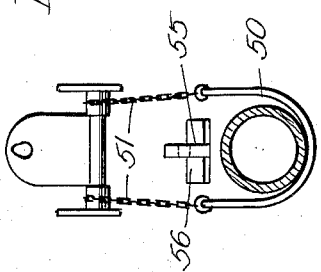
INVENTOR.
Kenneth C. Knapp,
BY United States Patent Office 2,841,893
Patented July 8, 1958

2,841,893

PIPELINE RECLAIMER

Kenneth C. Knapp, Oxford, Kans.

Application December 24, 1953, Serial No. 400,334

5 Claims. (Cl. 37—1)

This invention relates to apparatus for removing pipelines from the ground in which they are buried, and has for its principal object the provision of a new and improved apparatus of this kind.

It is a main object of the invention to provide apparatus for reclaiming pipelines from the ground in which they are buried, which apparatus is capable of economic operation under the widely varying conditions encountered in work of this kind.

Another object of the invention is to provide apparatus capable of reclaiming pipelines from the ground with a minimum of damage to the pipe, thereby rendering it available for further use.

Another object of the invention is to provide pipeline reclaiming apparatus which is of rugged construction and capable of withstanding the hard usage to which it will be subjected in normal use.

Another object of the invention is to provide pipeline reclaiming apparatus which can be manufactured and maintained in proper working condition at low cost.

Further objects of the invention not specifically mentioned here will be apparent from the description and claims which follow, reference being had to the accompanying drawings in which a preferred embodiment of the invention is shown by way of example and in which:

Fig. 1 is an elevational view of the earth-loosening unit of the apparatus;

Fig. 2 is an elevational view of the second or reclaiming and elevating unit of the apparatus;

Fig. 3 is an elevational view of the cradling units of the apparatus;

Fig. 4 is a fragmentary view taken substantially along the line 4—4 of Fig. 1, looking in the direction of the arrows;

Fig. 5 is a fragmentary view taken substantially along the line 5—5 of Fig. 1, looking in the direction of the arrows;

Fig. 6 is a plan view of the reclaimer and elevator unit shown in Fig. 2; and

Fig. 7 is an end elevational view of the cradle.

Throughout the country are numerous pipelines no longer being used, either because the field from which they conducted petroleum products has become exhausted or the line has become obsolete for other reasons. Notwithstanding that some of these lines were installed many years ago, the pipes from which they are made still have many years of useful life remaining in them. The practice of removing these obsolete pipelines and reclaiming the pipe therein for further use has become quite prevalent in the industry.

As will be readily appreciated, the conditions encountered in removing a pipeline vary over a wide range. The nature of the ground in which the line is buried varies from relatively soft sandy soil to hard clay containing many rocks and the like. Furthermore, the depth to which the pipelines have been buried varies from approximately two to six feet, and the depth on a particular pipeline may vary within these limits.

It will be apparent that if a pipeline is to be reclaimed from the ground and the pipe therein reconditioned for further use, the reclaiming and reconditioning operations must be carried on economically if the pipe is to be rendered available for further use, at a cost far enough below the cost of new pipe to make the use of second-hand pipe attractive.

It will be readily apparent that apparatus for removing the pipeline from the ground must be capable of coping with the widely varying conditions to be encountered, and further must be capable of economic operation if the overall cost of reclaiming and reconditioning the pipe is to be maintained low.

Numerous prior art arrangements for accomplishing the removal of pipe from the ground have been used heretofore and the present invention relates to the combination of improved units for loosening the cover of the pipe, breaking the pipe loose from the ground in which it is embedded, and elevating it to the surface of the ground where it can be cut into lengths convenient for hauling and such cleaning and reconditioning operations as may be necessary to fit the pipe for further use.

The present invention will thus be understood from reference to the accompanying drawings.

In Fig. 1, there is shown the lead unit consisting of a track-laying tractor 1 of the bulldozer type, having a yoke 2 pivotally connected to the body of the tractor on opposite sides thereof rearwardly of the center thereof, as shown at 3, and extending alongside of and across the front of the tractor. After the usual bulldozer blade has been removed, the yoke is equipped to mount the earth-loosening unit, usually referred to as a plow, upon the yoke. To this end there is fixed upon the yoke 2, at the center of the portion thereof extending across the front of the tractor, a generally vertical post-like member 4 which may be composed of angle, channel, or H-section structural member readily available upon the open market. Preferably the member 4 is attached to the yoke by welding. Fitted alongside of the member 4 and on opposite sides of the yoke 2 are reinforcing plates 5 preferably secured to the yoke and member 4 by welding.

Across the top of the member 4 is a brace 6 disposed substantially horizontally and from the ends of which side brace members 7 extend downwardly and rearwardly to the side arms of the yoke 2 to which they are attached preferably by welding.

Bulldozer tractors are equipped with apparatus for raising and lowering the yoke—in certain instances this apparatus consisting of hydraulic cylinders and suitable connections thereto, and in other instances mechanical devices such as a winch that is connected to the yoke by a traction member. The particular arrangement for raising and lowering the yoke forms no part of the present invention and is diagrammatically illustrated by the chain 8.

The earth-loosening apparatus is provided with a base 10 to which mounting plates 10a are fixed and these plates fit alongside of the post 4 and are attached thereto by bolts 11 to securely and rigidly mount the apparatus upon the tractor.

The earth-loosening apparatus, which is generally of the type shown in my co-pending application Serial No. 245,924, filed September 10, 1951, now Patent 2,675,-634, issued April 20, 1954, consists of a base member 12 that projects forwardly and downwardly from the mounting base 10 and from the free end of which a second member 13 is extended upwardly and rearwardly to the mounting base 10. Members 12 and 13 are joined together and to the mounting base 10 preferably by welding.

The upper member 13 is preferably a channel or H-shaped member disposed with its web horizontal.

Fixed to and extending along the longitudinal median line of the web member 13 is a centerboard 15 having a forward edge 16 that is sharpened to facilitate cutting through dirt, roots, and the like, encountered by the apparatus. Moldboards 17 and 17a, attached to the centerboard member 13 and base 10, aid in directing the dirt over the unit, as will readily be apparent.

At the apex of the triangle formed by members 12 and 13 are side cutters 18 that are adapted to extend alongside of a pipe line to loosen the dirt therearound. Cutters 18 are spaced apart far enough to clear couplings and the like that project outwardly from the pipe and leave a wall of dirt alongside the pipe that is not loosened. Pivotally mounted between the members 18 is a shoe 19 that engages the pipeline and limits the downward movement of the unit. The shoe 19 is arcuate in shape and serves also to keep the plow properly centered upon the pipe and the front end of the shoe is flared as shown at 20 to permit the shoe to ride over couplings and other obstructions projecting outwardly from the pipe.

The space between the upper and lower members 12 and 13 is closed by side plates 21 welded thereto to prevent entry of dirt into this space.

Since the plow-like structure is rigidly attached to the yoke of the tractor, movement of the yoke will raise and lower the plow, and since the pivot points 3 around which movement of the yoke is centered are located far rearwardly of the plow, as the plow is lowered into engagement with a deeply covered pipe, the change in pitch of the moldboards 17 will be less than would be the case if the plow were pivoted at the point at which it was connected to the yoke.

Track-laying tractors of the type employed as bulldozers are usually equipped with a power driven winch located in the rear, as indicated at 30.

The pipe reclaiming apparatus shown in Fig. 2 is connected to the tractor 1 by a suitable cable 31 attached to the tractor and extending through a sheave 32 on the reclaimer and thence back to the winch 30. The reclaimer unit, which is of the general type shown in my prior Patent 2,386,615, issued October 9, 1945, consists of an elongated member 33 having an arcuate upper surface and a base 34 with respect to which the upper surface is inclined. At the leading end of the unit are suitable brackets 35 to which traction bars 36 are connected and lead upwardly and forwardly, being joined together at their upper ends by a through bolt 37 by which the sheave 32 is connected to the unit. If desired, the leading edges of the traction bars 36 may be beveled, as shown at 38, to enable the bars to more easily cut through obstructions encountered; however, with the apparatus as shown, such beveling is not necessary.

The leading edge of the reclaimer 39 is beveled to form a cutting edge for digging through the ground beneath the pipe. Traction bars 36 are adjusted, in the manner disclosed in the above patent, so that the reclaimer runs below the pipe far enough to clear couplings and the like that project outwardly therefrom. In this manner there is formed beneath the pipe a layer of unloosened dirt which remains between the pipe and the inclined upper surface of the reclaimer. This layer cushions the pipe and protects it from being damaged by coming into direct contact with the reclaiming apparatus.

It is the function of the reclaimer to move along the pipeline beneath the same and to elevate the pipeline slightly thereby to break it loose from the ground in which it is embedded.

Immediately behind the reclaimer 33 is an elevator unit indicated generally at 40 and consisting of an upper preferably arcuate surface 41 and a base 42 preferably also arcuate so as to enable it to ride accurately in the concave groove formed beneath the pipe by the reclaimer unit. The two faces of the elevator are braced by suitable internal brace members 43 and the sides of the unit are covered by suitable side plates 44 so that the entrance of dirt into the unit is impossible.

The elevator is coupled to the reclaimer by a coupling which permits limited rotation of the elevator around a horizontal axis 45 disposed transversely of the pipeline and also around a vertical axis 46 likewise disposed transversely of the pipeline. The coupling thus formed is arranged to prohibit rotation of the elevator around an axis parallel to the axis of the pipe, thus insuring that the elevator will remain in upright position and will not be tilted sideways by a lateral movement of the pipe. The slope of the upper surface 41 of the elevator is gradual, preferably falling in the range of from one-half to one inch per linear foot of pipe. The function of the elevator is to raise the pipeline through the trench of loosened dirt towards the surface of the ground as the unit moves along the pipeline.

In order to bring the pipeline completely out of the ground, I provide a cradle 50 consisting of a generally U-shaped member that is supported by suitable flexible means such as chains 51 upon the side boom 52 of a second track-laying tractor 53. Preferably the cradle travels at a considerable distance behind the other units so that the angle of inclination of the pipe established by the elevator is maintained and bending of the pipe thereby prevented. In certain instances, with large diameter pipes, the cradle 50 may be as much as 100 feet behind the reclaimer unit, and to insure that a desired distance will be maintained a cable 54 attached to the sheave 32 by which the reclaimer is connected to the first tractor, is connected to the cradle by suitable linkage 55 and the cradle is pulled along the pipeline by forward movement of the first tractor rather than by the tractor 53 which serves merely to elevate the cradle to a desired position. Linkage 55 preferably includes a shoe 56 which rides on the surface of the ground when cable 54 is slack, to maintain the linkage in proper working position.

In the operation of the apparatus thus described, the plow is lowered into engagement with the pipe and tractor 1 operated to push it therealong, the tractor 1 simultaneously dragging the reclaimer and elevator and cradle along the pipeline as it travels. It will frequently happen that because of the muddy condition of the surface of the ground or nature of the ground in which the pipeline is buried, a depth to which it is buried, tractor 1 will not have sufficient power to move the apparatus along the pipeline unaided. To meet a contingency of this kind, centerboard 15 of the plow is equipped with perforations to which a cable 60 may be attached by a suitable clevis 61 and the cable 60 extended to one or more track-laying tractors which aid the tractor 1 in pushing the plow along the pipeline.

In certain instances of rather difficult conditions, as many as four additional tractors have been used for this purpose. When conditions permit, the plow, reclaimer, elevator and cradle are all moved simultaneously along the pipeline. When particularly adverse conditions prohibit such operations, winch 30 on the tractor can be released and tractor 1 operated with the aid of the preceding tractors to move the plow along the pipeline, leaving the reclaimer, elevator and cradle stationary. The cable 31 is played out from the winch and when the cable has been completely played out tractor 1 is stopped and the power thereof delivered to the winch to operate it to pick up its cable and thereby move the reclaimer, elevator and cradle along the line. With this arrangement, pipelines have been removed from the ground under extremely difficult conditions and the operation has been cheap enough to render the same economical.

After the pipeline passes over the cradle 50, it settles to the surface of the ground and, if desired, could be laid back into the loose dirt that practically fills the trench opened by the plow; however, if the pipeline were so positioned, it would be difficult to perform the operation of cutting the pipe into lengths, and therefore it is preferable to employ another tractor 70 that is equipped with a side boom 71 from which is supported a roller cradle 72 that engages the pipe and pulls it over alongside of the trench of loosened dirt, permitting it to be laid on solid ground. The use of such a lay-over cradle, while advantageous in most instances, is not necessary to the proper function of the reclaimer apparatus of the present invention.

From the foregoing it will be seen that the earth-loosening unit or plow loosens up the dirt covering the pipeline, but does not expose the pipeline. No accurately defined trench remains after the plow passes over a given point since most of the dirt moved by the plow falls back into the trench in a loosened condition. The reclaimer breaks the pipe loose from the ground in which it is embedded, and the elevator starts it on a gradual movement upwardly through the loosened dirt in the trench, the cradle following along behind the elevator ultimately bringing the pipe to the surface of the ground and thereabove. Dirt brought up by this upward movement of the pipe falls off of the pipe and back into the trench.

With the apparatus as shown, when the pipe emerges from the ground it is protected by a layer of dirt which completely surrounds it and movement of the reclaimer, elevator and cradle along the pipe does not damage it in any way; in fact, pipe that has been coated and wrapped has been removed by the apparatus without damage to the coating and wrapping.

While I have chosen to show my invention by illustrating and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What is claimed is:

1. Apparatus for removing pipelines from the ground comprising: the combination with a track-laying tractor having a yoke pivoted to its frame near its rear end and extending around its front end, and having a power winch on its rear end; of an earth loosening unit comprising: a generally vertical post-like member fixed upon the front end of the yoke of the tractor; a mounting base rigidly fixed to said post member; spaced apart base members fixed to said mounting base and extending forwardly and downwardly therefrom; a center board positioned midway between said base members and fixed thereto, and extending upwardly therefrom and fixed to said mounting base; mold boards fixed between said center board and base members, with the outer edges of the mold boards aligned with the outer edges of the base members, said unit being moved along a pipeline by the tractor to loosen the earth above and alongside the pipeline, the earth so loosened falling back onto the pipeline as the unit moves therealong; a reclaimer unit pulled along beneath the pipeline by a cable attached to the winch as the tractor moves along the line to break the pipe loose from the earth in which it is embedded; an elevator unit pulled along beneath the pipe by the reclaimer to elevate the pipe through the loosened earth towards the surface; and a cradle engaging the pipe, supported by a boom tractor and pulled along the pipe by a cable attached to the junction of the reclaimer and winch cable for elevating the pipe out of the loosened earth and depositing it thereupon.

2. Apparatus as claimed in claim 1, in which the depth to which the earth-loosening unit is set by movement of the yoke is limited by a shoe that engages the upper surface of the pipe and is flared at its leading edge so as to enable it to ride over couplings which project outwardly from the pipe.

3. Apparatus as claimed in claim 1, in which the earth-loosening unit terminates at its lower leading end in blades which extend alongside the sides of the pipe and are spaced therefrom sufficiently to clear couplings that project outwardly from the surface of the pipe.

4. Apparatus as claimed in claim 1, in which the coupling between the reclaimer unit and elevator unit permits relative rotation of the units around a vertical axis and a horizontal axis disposed transversely of the pipe and prevents rotation around an axis extending longitudinally of the pipe thereby insuring that the movement imparted to the pipe by the elevator will be vertical.

5. Apparatus as claimed in claim 1, in which the loosening unit, reclaimer unit, elevator unit and cradle are moved along the pipeline simultaneously by the tractor when soil conditions permit, and in which through operation of the winch the loosening unit can be moved ahead independently and the reclaimer, elevator, and cradle subsequently moved when adverse soil conditions require.

References Cited in the file of this patent

UNITED STATES PATENTS

| | | |
|---|---|---|
| 1,866,381 | Ward | July 5, 1932 |
| 1,969,949 | Schroder-Stranz et al. | Aug. 14, 1934 |
| 2,358,495 | Pace | Sept. 19, 1944 |
| 2,386,615 | Knapp | Oct. 9, 1945 |
| 2,414,994 | Wright | Jan. 28, 1947 |
| 2,470,255 | Marks et al. | May 17, 1949 |
| 2,527,343 | Wilson | Oct. 24, 1950 |
| 2,528,231 | Knapp | Oct. 31, 1950 |
| 2,645,043 | Booton et al. | July 14, 1953 |
| 2,675,634 | Knapp | Apr. 20, 1954 |